(12) United States Patent
Kaler et al.

(10) Patent No.: US 7,356,616 B2
(45) Date of Patent: Apr. 8, 2008

(54) MAINTAINING STRUCTURED TIME DATA FOR ELECTRONIC MESSAGES

(75) Inventors: Christopher G. Kaler, Sammamish, WA (US); Steven E. Lucco, Bellevue, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 10/289,947

(22) Filed: Nov. 6, 2002

(65) Prior Publication Data

US 2004/0088433 A1 May 6, 2004

(51) Int. Cl.
*G06F 15/16* (2006.01)
(52) U.S. Cl. ............... 709/246; 709/206; 709/207; 709/236
(58) Field of Classification Search .......... 709/206, 709/246, 207, 236
See application file for complete search history.

(56) References Cited

U.S. PATENT DOCUMENTS

| 6,721,784 | B1* | 4/2004 | Leonard et al. ............. 709/206 |
| 7,243,152 | B2* | 7/2007 | Guggisberg ................ 709/206 |
| 2001/0034769 | A1* | 10/2001 | Rast .......................... 709/206 |
| 2002/0087861 | A1* | 7/2002 | Segev et al. ................ 713/168 |
| 2002/0107811 | A1* | 8/2002 | Jain et al. .................... 705/64 |
| 2003/0110131 | A1* | 6/2003 | Alain et al. .................. 705/51 |
| 2003/0110373 | A1* | 6/2003 | Champion ................... 713/153 |
| 2003/0131049 | A1* | 7/2003 | Banerjee et al. ............ 709/203 |
| 2003/0131142 | A1* | 7/2003 | Horvitz et al. .............. 709/313 |
| 2003/0233420 | A1* | 12/2003 | Stark et al. ................. 709/206 |
| 2005/0080865 | A1* | 4/2005 | Leach et al. ................ 709/206 |

OTHER PUBLICATIONS

Lais, Sami. Computerworld. Framingham: Jul. 9, 2001, vol. 35, Iss. 28; p. 37, 1 pgs.*
Reinshagen, Dirk. JavaWorld. San Francisco: Mar. 2, 2001. p. 1.*
Loshin, Pete. Computerworld. Framingham: Sep. 4, 2000. vol. 34, Iss. 36; p. 68, 1 pgs.*
EE Times. Tonobridge: Apr. 22, 2002. p. 16.*

* cited by examiner

*Primary Examiner*—John Follansbee
*Assistant Examiner*—Hassan Phillips
(74) *Attorney, Agent, or Firm*—Workman Nydegger

(57) ABSTRACT

A message processor accesses an electronic message. The message processor identifies from within the electronic message any schema-based time markers including time related message data associated with the message processor. The message processor determines if a schema-based time marker within the electronic message should be modified. This can include signing a portion of time related message data to indicate to a subsequent message processor that the time related message data can be trusted. The message processor routes the message (either directly or through one or more intermediary message processors) to a destination message processor. The destination message process receives the message and processes the electronic message according to time related message data included in the message. This can include trusting the portion time related data that was singed by the message processor.

38 Claims, 6 Drawing Sheets

MAINTAINING STRUCTURED TIME DATA FOR ELECTRONIC MESSAGES

RELATED APPLICATIONS

This application is related to commonly-assigned, co-pending, U.S. patent application Ser. No. 10/177,470, filed Jun. 21, 2002, which is entitled "Measuring Performance Metrics of Networked Computing Entities By Routing Network Messages."

BACKGROUND OF THE INVENTION

1. The Field of the Invention

The present invention relates to processing electronic messages, and more specifically, to maintaining structured time data for electronic messages.

2. Background and Relevant Art

Computer networks have enhanced our ability to communicate and access information by allowing one computer or device (hereinafter both referred to as a "computing system") to communicate over a network with another computing system using electronic messages. In order for such electronic messaging to be meaningful, the receiving computing system must process the received electronic message correctly. For example, an encrypted e-mail message must be decrypted using the proper decryption algorithm, then parsed into its various components (e.g., message body and "from", "to", "cc" and "time sent" header fields). If decryption or parsing are performed in an incorrect manner, the e-mail would not be able to be displayed properly to a user.

Often, supplemental information is necessary or helpful in order to appropriately process a received electronic message. Sometimes, that supplemental information is locally available for retrieval at the time the electronic message is received. Other times, information from another network location is accessed in order to appropriately process the received network message.

At times, information needed to process an electronic message is included within the electronic message itself. For example, a network message can have a header field that includes information for processing the message. Unfortunately, the number and types of network fields are often restricted to fixed types of data. For example, an electronic mail message can include a header indicating the time the electronic mail message was initially sent and the time that other computing systems, through which the electronic message was routed, received the message. However, some computing systems that route electronic mail messages do not have the functionality to include other time information (e.g., time required to process a message, the time a message expires, etc.) within a header. Even computing systems that do have this functionality, often store this other time information in fixed locations within a header and/or store free-formed time information. For example, some binary-based protocols built upon TCP (i.e., that operate above TCP in a protocol stack) can include a time stamp at specific locations (e.g., at a fixed offset) within a header.

Further, for information in a header to be helpful in processing an electronic message, a computing system must be able to retrieve the information from the electronic message. Thus, even if a first computing system has the functionality to insert time information into an electronic message, other computing systems may not be natively configured to retrieve the time information and/or may require specialized parsers to locate the time information within the electronic message. For example, header information included in electronic mail messages is typically represented by an unstructured string of text. When a computing system adds new information to a header (whether it be time information or some other type of information), the new information is simply concatenated to the existing string of text.

Thus, time information along with various other types of information (e.g., type of message, subject of message, message recipients) might all be included within a header as a single unstructured string of text. However, computing systems that route electronic mail messages typically do not include the functionality to parse these unstructured strings of text to locate time information. Thus, to retrieve time information at designated routing computing systems, each designated computing system would have to include a specialized parser.

Therefore systems, methods, computer program products, and data structures for maintaining structured time data for electronic messages would be advantageous.

BRIEF SUMMARY OF THE INVENTION

The foregoing problems with the prior state of the art are overcome by the principles of the present invention, which are directed towards methods, systems, computer program products, and data structures for maintaining structured time data for electronic messages.

A distributed system includes a number of message processors that can route electronic messages. One of the message processors (e.g., an originating message processor, an intermediary message process, or a destination message process) accesses an electronic message as the electronic message is being routed through the distributed system. This can include accessing a header portion of a Simple Object Access Protocol ("SOAP") message that contains eXtensible Markup Language ("XML") instructions configured in accordance with an XML schema. Accordingly, the message processor can identify (from within the electronic message) any schema-based time markers including time related message data associated with the message processor. This can include identifying time-related message data maintained within XML elements in the header portion of the SOAP message. Processing operations can be performed at the message processor based on the time related message data within the identified XML elements. For example, identified time-related message data can indicate to the message processor that the electronic message is expired and should not be processed.

The message processor determines if the configuration of any schema-based time markers within the message should be modified. This can include determining if XML elements and/or time related message data contained in a schema-based time marker should be added, changed, and/or deleted according to the XML schema. In some embodiments, the message processor determines that a portion of time related message data should be signed so as to indicate to a subsequent message processor that the portion of time related message data can be trusted. The message processor can implement any modifications that are determined to be appropriate.

The message processor routes the electronic message to a subsequent message processor included in the routing path. This can include routing the electronic message (either directly or through one or more intermediary message processors) to a destination message processor that is to process the body portion of the electronic message.

The destination message processor processes a portion of the electronic message according to any schema-based time markers included in the electronic message. This can include processing a portion of the SOAP message according to XML instructions in the header portion of the SOAP message, including any XML instructions having time related message data that is configured in accordance with an XML schema. In some embodiments, the destination message processor processes a portion of the time related message data as trusted time-related message data because a trusted intermediary message processor signed the time related message data.

Since schema-based time markers maintain a structure and meaning of time related message data according to a schema, the time related message data can be more easily identified and processed at a message processor. Further, because a schema can define virtually any type of data, the time-related message data that can be maintained is not limited or restricted to fixed types of data.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
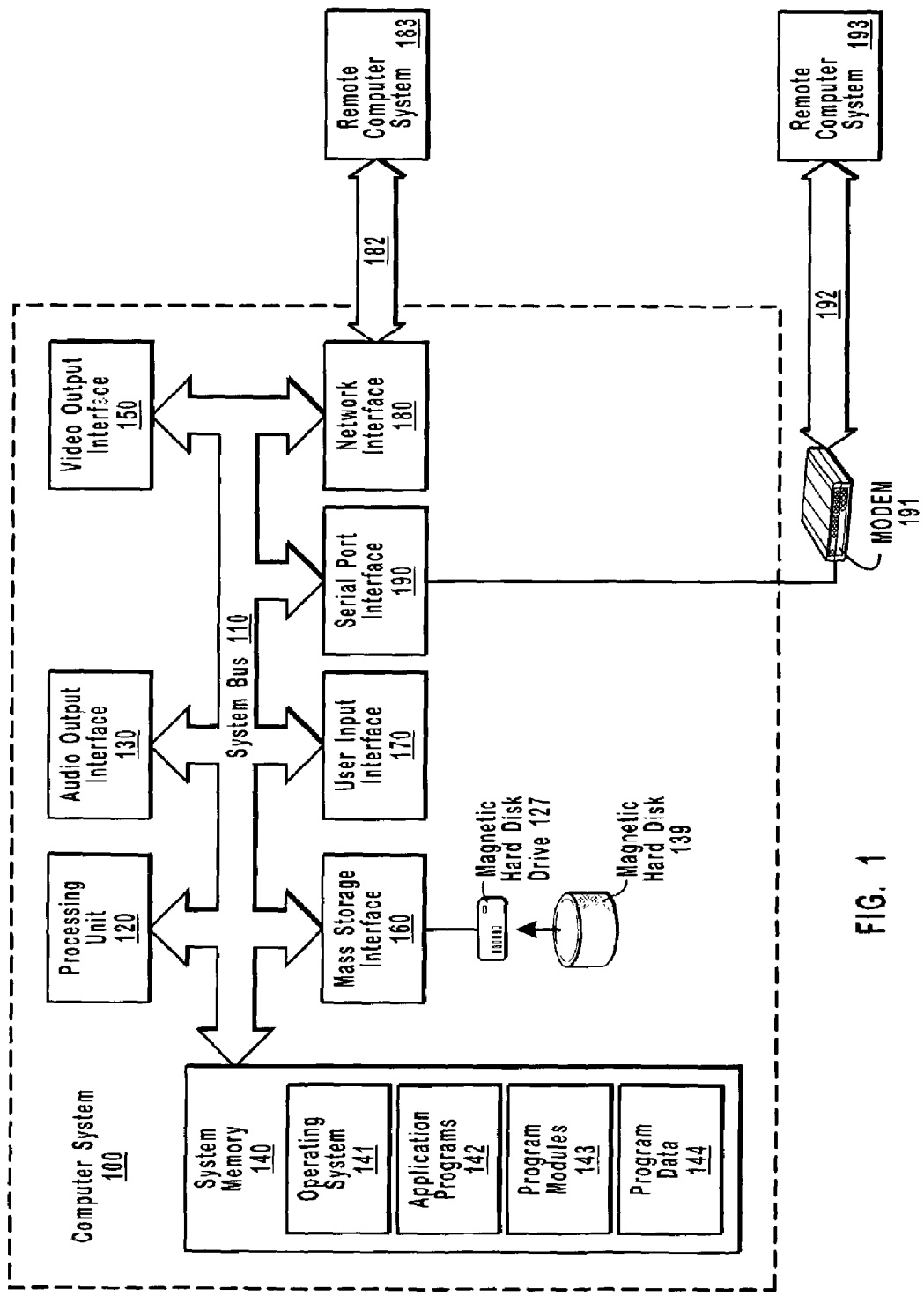
FIG. 1 illustrates a suitable operating environment for the principles of the present invention.

The principles of the present invention provide for maintaining structured time related message data within schema-based time markers included in an electronic message. A message processor within a distributed system accesses an electronic message. The message processor identifies any time related message data associated with the message processor (from within the electronic message) according to a schema that is shared with other message processors in the distributed system. The message processor can be caused to perform processing operations based on identified time related message data. The message processor determines if any schema-based time markers or time related message data included in the message should be modified. If it is determined that modifications are to occur, the message processor can implement the modifications in accordance with the schema. The message processor routes the electronic message along a routing path to a destination message processor.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "message processor" is defined as one or more modules (hardware and/or software) that operate together to perform messaging operations on electronic messages. Messaging operations may include, for example, initiating a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system.

In this description and in the following claims, a "schema" is defined as an expression of a shared vocabulary between a plurality of computer systems and/or a plurality of message processors that allows the plurality of computer systems and/or the plurality of message processors to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. Further, any computer system or message processor that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important.

A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema.

In this definition and the following claims, "schema-based" refers to being defined by and/or within a schema.

In this description and in the following claims, "immutable data" is defined as data having an increased likelihood of remaining constant for the lifetime of the data. For example, if the creation time of an electronic message is included within the electronic message as a numeric value (or stored in some other manner) it is unlikely that this numeric value would change for lifetime of the electronic message (or for the time it is stored).

In this description and in the following claims, "mutable data" is defined as data having a reduced likelihood of remaining constant for the lifetime of the data. For example, if the time the last message processor received an electronic message is included within the electronic message as a numeric value, this numeric value would likely change each time a new message processor receives the electronic message.

In this description and the following claims, "time related message data" is defined generally to include, but is not limited to, time data stored as the result of a messaging event, such as, for example, message creation, message expiration, ignoring a message, sending a message, receiving a message, time delays resulting from processing a message, the time an electronic message was seen. Time related message data can be represented using virtually any types of values including, numeric values (e.g., 12, D4, 11001, etc.), characters of text (e.g., "c", "v", "6", etc.), strings of text (e.g., "06:45:33", "Delay=132 ms", etc.), or user-defined values. It may be that time related message data includes a plurality of values where each value represents the value of a field in a data structure.

Time related message data can include absolute time values (e.g., 13:04:04 or 1:04:04 PM) and/or relative time values (e.g., within 5 minutes of message creation). Time related message data can include time values represented using virtually an type of units, such as, for example, months, days, hours, minutes, seconds, milliseconds, microseconds, etc. Thus, it may be that time related message data also includes values associated with a date, such as, for example, a day of the week (Monday, Tuesday, etc), a month (March, April, etc.) or a year (2002, 2003, etc).

The definition of time related message data is further defined to include, signed and/or encrypted and/or validated time related message data (or portions thereof), such as, for example, time related message data resulting from a messaging event. The definition of time related data is further defined to include, an indication of signing, encryption, decryption, and validating algorithms (as well as auxiliary data such as for example a symmetric, public, or private key) used to sign, encrypt, decrypt, and validate time related message data, such as, for example, time related message data resulting from a messaging event.

In this description and the following claims, a "time marker" is defined as a data structure that is configured to store time related message data. For example, a time marker can be a header within a header portion of an electronic message where time related message data is maintained for the electronic message.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or nonvolatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 can be a client, an application server, or an authentication server.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 can be a client, an application server, or an authentication server.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, as well as associated data, including electronic messages, time related message data, schemas, and schema-based time markers, may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules and associated data, or portions thereof, can be stored in remote memory storage devices, such as, for example, system memory and/or mass storage devices associated with remote computer system 183 and/or remote computer system 193. Execution of such modules may be performed in a distributed environment as previously described. For example, message processing modules included in computer system 100 may access one or more schemas stored at remote computer 183 and/or remote computer system 193 when processing schema-based time markers included an electronic message.

Figure 2:
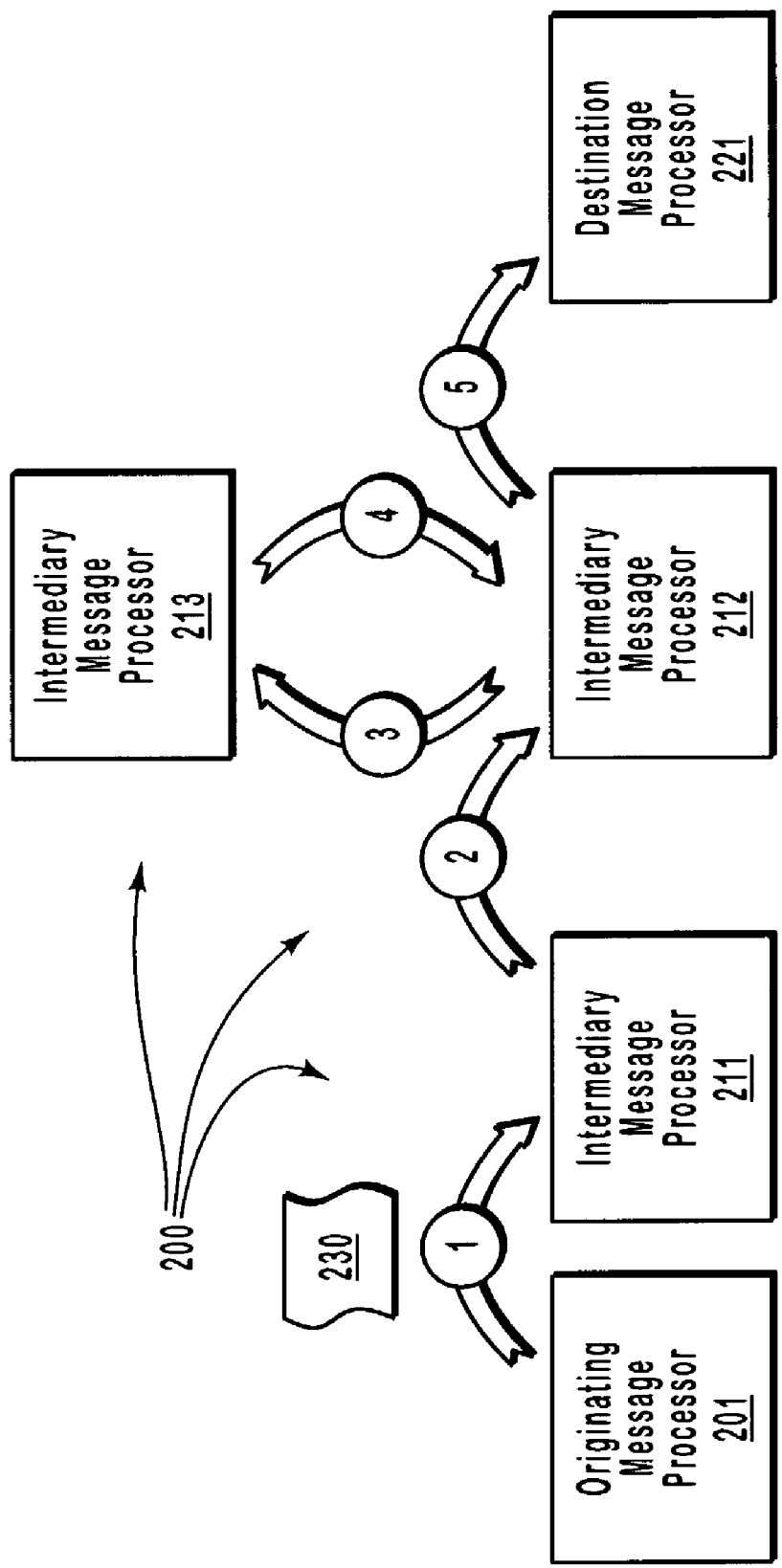
FIG. 2 illustrates an example of a network architecture that can facilitate processing schema-based time markers.

FIG. 2 illustrates an example of network architecture 200 in which structured time related message data can be maintained. Depicted in network architecture 200 are originating message processor 201, intermediary message processors 211, 212, and 213, and destination message processors 221. The message processors included in network architecture 200 can be connected to one another via one or more logical communication links (not shown). Further, the message processors included in network architecture 200 can have access to a common schema, such as, for example, an XML schema file, that provides a shared vocabulary between the message processors. The message processors in network architecture 200 can process schema-based time markers and time related message according to the common schema.

Figure 3:
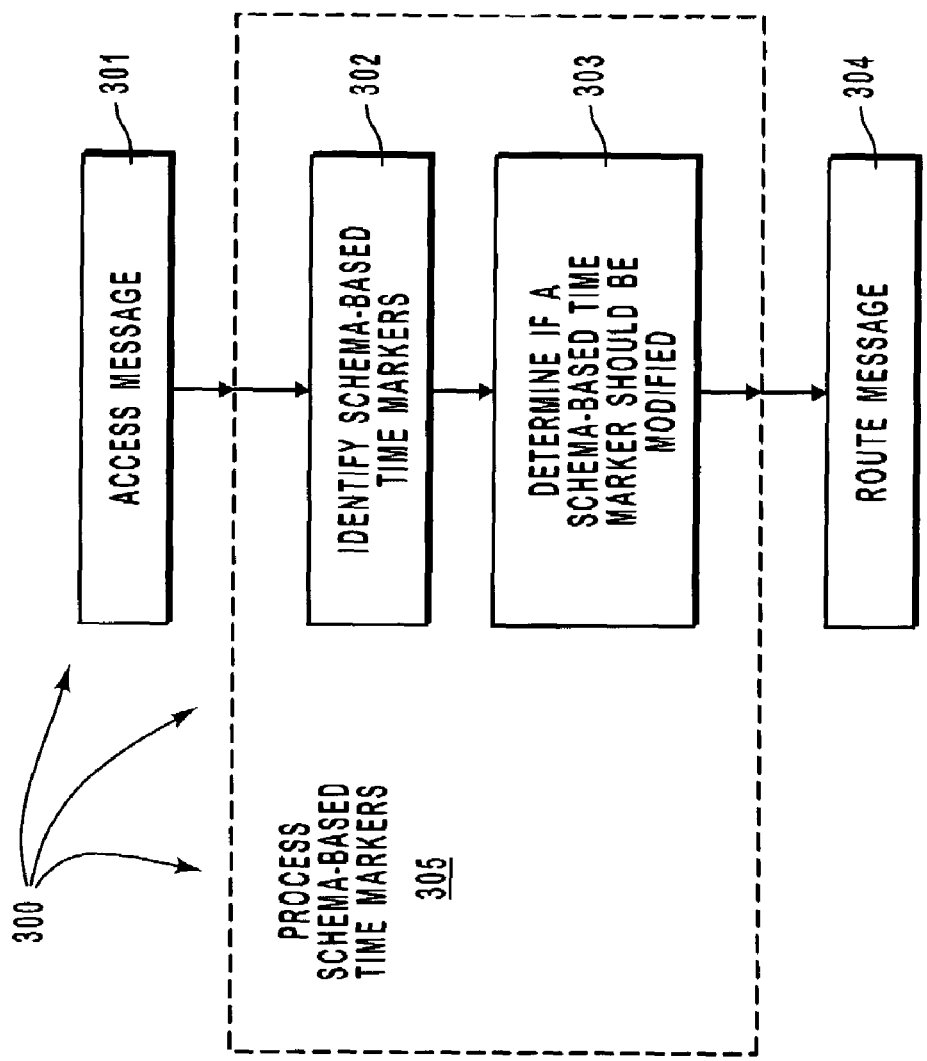
FIG. 3 illustrates a flowchart of a method for maintaining time related message data included in an electronic message.

FIG. 3 illustrates a flowchart of a method 300 for maintaining time related message data for an electronic message. The method 300 will be described with respect to the message processors depicted in network architecture 200.

Method 300 includes an act of accessing a message (act 301). This can include accessing an electronic message, such as, for example, electronic message 230. Originating message processor 201 can initiate message 230, which is to be routed along a routing path from originating message processor 201 to destination message processor 221. Intermediary message processors 211, 212, and 213 may be message processors included in the routing path.

As shown by arrow 1 in FIG. 2, originating message processor 201 can transfer electronic message 230 to intermediary message processor 211. Message 230 may subsequently be transferred between other intermediary message processors as illustrated by arrows 2, 3 and 4 in FIG. 2 and arrive at destination message processor 221 as illustrated by arrow 5 in FIG. 2. Any one of the message processors depicted in network architecture 200 can access message 230 in accordance with the principles of the present invention.

It should be understood that the labeled arrows in FIG. 2 are for descriptive purposes so as to illustrate the flow of message 230. However, this labeling is not meant to imply that message 230 is necessarily transferred between the message processors of network architecture 200 in any particular order.

Figure 5:
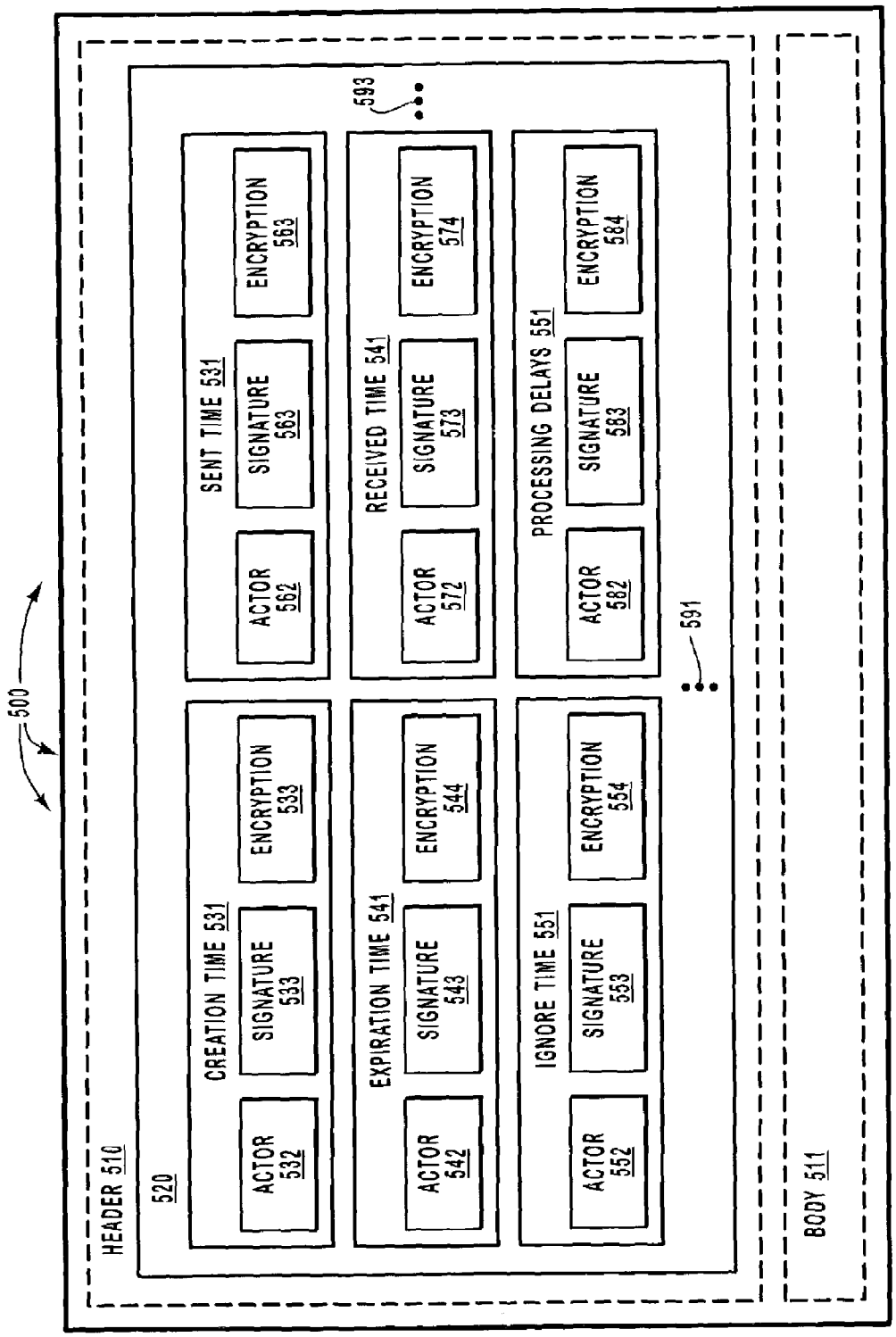
FIG. 5 illustrates a first example of a message containing a schema-based time marker.

Depicted in FIG. 5 is a message 500. Message 500 is an example of one format of message that can be used when implementing the principles of the present invention. Message 230 may be of a format similar to message 500. Message 500 includes header 510 and body 511. Generally, header data included in header 510 determines how the body 511 is to be processed. In the example message 500, header 510 includes schema-based time marker 520, which further includes the elements creation time 531, expiration time 541, ignore time 551, sent time 561, received time 571, and processing delays 581. Ellipsis 593 and vertical ellipsis 591 illustrate that other time related data can be included within schema-based time marker 520. Although a single schema-based time marker (schema-based time marker 520) is illustrated within header 510 it should be understood other schema-based time markers could also be included.

In some embodiments, time related message data in an element can be targeted to a specific message processor. To target time related message data to a specific message processor, a pointer to the specific message processor, such as, for example, a Uniform Resource Identifier ("URI") or network address can be associated with the time related message data. Within electronic message 500 this can be implemented by including an actor field (e.g., actors 532, 542, 552, 562, 572, and 582) within an element. Actor fields in message 500 can represent a name-valve pair, such as, for example, an actor attribute and a corresponding actor attribute value.

An attribute value can be represented using virtually any type of value including, a numeric value (e.g., 9, FE, 10010, etc.), a character of text (e.g., "a", "f", "7", etc.), a string of text (e.g., "www.test.com", "DES", etc.), or a user-defined value. It may be that an attribute value represents the value of a field in a data structure.

In other embodiments, time related message data in an element can be signed. To indicate that time related message data has been signed, such as, for example, by a prior message processor, a signing indicator can be associated with the time related message data. It may be that a signature from a first message processor indicates to a second message processor that time related message data from a third message processor should be trusted. Within electronic message 500 this can be implemented by including a signature field (e.g., signatures 533, 543, 553, 563, 573, and 583) within an element. Signature fields in message 500 can represent a name-value pair, such as, for example, a signature attribute and a corresponding signature attribute value.

Further, virtually any number of signature fields can be included in a message. Each of these signature fields can include a name value pair representing a signature attribute and a corresponding signature attribute value. A signature attribute value can include one or more signatures. As a message is routed through a message processor, signatures can be inserted into a message without affecting existing signatures. This can include adding additional signature fields to a message or adding additional signatures to an existing signature attribute value.

In yet other embodiments, time related message in an element can be encrypted. To indicate that time related message data has been encrypted, such as, for example, by a prior message processor, an encryption indicator can be associated with the time related message data. An encryption indicator can include the encryption algorithm used to encrypt the time related message data. However, unless a message processor has access to a an appropriate key, such as, for example, a symmetric key or a private key corresponding to a public key used to encrypt the time related message data, the encrypted time related message data cannot be decrypted. Thus, if a first message processor has access to the public key for a second message processor, the first message processor can encrypt time related message data that can only be decrypted with the corresponding private key for the second message processor. Within electronic message 500 this can be implemented by including an encryption field (e.g., encryption 534, 544, 554, 564, 574, and 584) within an element. Encryption fields in message 500 can represent a name-value pair, such as, for example, an encryption attribute and a corresponding encryption attribute value.

It should be understood that the present invention is not limited to messaging using any specific transport protocol and format. However, one example protocol that may be used to implement the principles of the present invention is called Simple Object Access Protocol ("SOAP"). Message 230 may be a SOAP message that uses any number of lower level protocols, such as, for example, HyperText Transfer Protocol ("HTTP") or Direct Internet Message Encapsulation ("DIME") as a transport. The following is a structure in which a schema-based time marker is included within the body a first example SOAP envelope:

are included merely to illustrate one example of some of the elements that can be used to implement the principles of the present invention. Depending on the desired functionality none, one, some, or all of these elements, can be included in an electronic message. Further, it would be apparent to one skilled in the art, after having reviewed this description, that a wide variety of other elements, in addition to the illustrated elements, can be used to implement the principles of the present invention.

The Timestamps element has a "Target" attribute, which can be used to represent the ultimate receiver, such as, for example, the destination message processor, of the first example SOAP envelope. This can include referencing the destination message processor by network address or URI.

```
1.   <Envelope>
2.      <Header>
3.         .
4.         .
5.         .
6.         <Timestamps Target = ". . .">
7.            <Created Actor = ". . ." Sig = ". . ." Enc = ". . .">
8.               CREATION TIME RELATED MESSAGE DATA
9.            </Created>
10.           <Expires Actor = ". . ." Sig = ". . ." Enc = ". . .">
11.              EXPIRATION TIME RELATED MESSAGE DATA
12.           </Expires>
13.           <IgnoreAfter Actor = ". . ." Sig = ". . ." Enc = ". . .">
14.              IGNORE TIME RELATED DATA
15.           </IgnoreAfter>
16.           <Sent Actor = ". . ." Sig = ". . ." Enc = ". . .">
17.              SENT TIME RELATED MESSAGE DATA
18.           </Sent>
19.           <Received Actor = ". . ." Sig = ". . ." Enc = ". . .">
20.              RECEIVED TIME RELATED MESSAGE DATA
21.           </Received>
22.           <Delay Actor = ". . ." Sig = ". . ." Enc = ". . ." Unit = ". . .">
23.              DELAY TIME RELATED MESSAGE DATA
24.           </Delay>
25.           <Generic Actor = ". . ." Sig = ". . ." Enc = ". . ." Type = ". . .">
26.              GENERIC TIME RELATED MESSAGE DATA
27.           </Generic>
28.        </Timestamps>
29.        .
30.        .
31.        .
32.     </Header>
33.     <Body>
34.        .
35.        .
36.        .
37.     </Body>
38. </Envelope>
```

The elements and attributes within the header portion of the first example SOAP envelope (i.e., between the <Header> and </Header> elements) can include one more XML documents defined in accordance with an XML schema that is accessible to the message processors depicted in network architecture 200. Where an ellipsis or vertical ellipsis appears, this indicates that other header information and/or body information can be included in the first example SOAP envelope.

The first example SOAP envelope includes a Timestamps element (i.e., between <Timestamps> and </Timestamps>) with a "Created" element, an "Expires" element, an "Ignore-After" element, a "Sent" element, a "Received" element, a "Delay" element, and a "Generic" element. However, inclusion of all of these elements within the first example SOAP envelope (or any other message) is optional. These elements The Created element (lines 7-9) is an example of an element that can be used to store a value (e.g., in Created Time Related Message Data) for a time the first example SOAP envelope was created. The Expires element (lines 10-12) is an example of an element that can be used to store a value (e.g., in Expiration Time Related Message Data) for an expiration time of the first example SOAP envelope. The IgnoreAfter element (lines 13-15) is an example of an element that can be used to store a value (e.g., in Ignore Time Related Message Data) for a time after which the first example SOAP envelope can be ignored. The Sent element (lines 16-18) is an example of an element that can be used to store a value (e.g., in Sent Time Related Message Data) for a time the first SOAP envelope was sent from a message processor.

The Received element (lines 19-21) is an example of an element that can be used to store a value (e.g., in Received Time Related Message Data) for a time the first SOAP envelope was received at a message processor. The Delay element (lines 22-24) is an example of an element that can be used to store a value (e.g., in Delay Time Related Message Data) for the amount of time a message processor held the first example SOAP envelope for processing.

The Generic element (lines 25-27) is an example of an generic timestamp element that can be used to store (e.g., in GenericTime Related Message Data) extensible and/or user-defined time related message data, such as, for example, when a message was routed through a message processor or data indicating that the body or signatures of the first example SOAP envelope should be validated at a specified time. One specific type of generic timestamp is a Notarize timestamp (e.g., represented by <Notarize> and </Notarize> elements). A Notarize timestamp can be used to indicate to a first message processor that a second message processor has authenticated time related message data included in a message.

Each of these elements (at lines 7, 10, 13, 16, 19, 22 and 25) includes an "Actor" attribute, a "Sig" attribute, and an "Enc" attribute. Each of these attributes (as well as any other attributes) can have an attribute value resulting in a corresponding name-value pair. The Actor attribute can indicate one or more message processors, such as, for example, by including a URI, that are to process time related message data corresponding to an element. For example, the Actor attribute of the Created element (at line 7) can be used to indicate a message processor that is to process the Creation Time Related Message Data (at line 8). The Sig attribute can indicate one or more message processors that signed the time related message data corresponding to the element. For example, the Sig attribute of the Expires an element (at line 10) can be used to indicate that one or more message processors that signed the Expiration Time Related Message Data (at line 11). The Enc attribute can indicate that time related message data corresponding to an element has been encrypted. For example, the Enc attribute of the Received element (at line 19) can be used to indicate that the Received Time Related Message Data (at line 20) is encrypted.

The Delay element (at line 22) also includes a "Units" attribute. The Units attribute can be used to indicate the units, such as, for example, microseconds, milliseconds, second, etc., associated with the Delay Time Related Data (at line 23). The Timestamp element (at line 25) also includes a "Type" attribute. The Type attribute can be used to indicate the type of the generic timestamp defined by the Timestamp element. For example, including a Type attribute value of "Notary" can indicate that a Generic timestamp is a Notary timestamp.

When implementing the principles of the present invention, it should be understood that attributes and attribute values can be varied across the different elements. For example, Ignore Time Related Message Data (at line 14) may be directed to a first message processor (by an attribute value for a corresponding Actor attribute), while Delay Time Related Message Data (at line 23) is directed to a second and third message processor (by an different attribute value for a different corresponding Actor attribute). Likewise, some elements may be encrypted, others may be signed, yet others may be both signed and encrypted, and yet even others may neither be signed nor encrypted.

When implementing the principles of the present invention, it should be further understood that depending on the desired functionality none, one, some, or all of the attributes described with respect to the first example SOAP message can be included in an element. These attributes are described merely to illustrate one example of some of the attributes that can be used to implement the principles of the present invention. Further, it would be apparent to one skilled in the art, after having reviewed this description, that a wide variety of other attributes, in addition to the illustrated attributes, can be used to implement the principles of the present invention.

Returning to FIG. 3, the method 300 includes a functional, result-oriented step for processing schema-based time markers (step 305). Step 305 may include any corresponding acts for accomplishing the result of processing schema-based time markers. However, in the illustrated example of FIG. 3, the step 305 includes a corresponding act of identifying schema-based time markers (act 302). This can include identifying from within an electronic message any schema-based time markers including time related message data associated with the accessing message processor. For example, intermediary message processor 211 can identify from within message 230 any schema-based time markers including time related message data associated with intermediary message process 211. Intermediary message processor 211 may refer to the common schema to determine the structure of time related data message within a schema-based time marker.

Time related message data can be associated with a message processor in a variety of ways. It may be that a URI for the message processor is included as a value of a Target or Actor attribute. For example, when message 230 is at intermediary message processor 211, intermediary message processor 211 may insert a URI of intermediary message processor 212 as an Actor attribute value within message 230. If message 230 is subsequently received at intermediary message processor 212, intermediary message processor 212 can determine that the element including the URI as an Actor attribute value is to be processed at intermediary message processor 212.

It may also be that a message processor compares its current time value to different portions of time related message data included in message 230 to determine an association. For example, a message processor may compare its current clock value against Expiration and/or Ignore Time Related Message Data to see determine if a message is expired and/or can be ignored. If a message is not expired and cannot be ignored, time related message data included in the message processor can be viewed as being associated with the message processor.

It may also be that some elements are by default associated with all message processors. For example, each message processor that receives an electronic message may by default update the Delay Time Related Message Data within the message. Thus, by default each message processor is associated with the Delay Time Related Message Data.

Step 305 also includes a corresponding act of determining if configuration of a schema-based time marker should be modified (act 303). This can include the accessing message processor determining if the configuration of a schema-based time marker within the message should be modified (act 302). For example, if intermediary message processor 211 accesses message 230, intermediary message processor 211 can determine if any elements, attributes, attribute values, or time related message data within message 230 should be inserted, modified, or deleted. Message processor 211 can also implement any insertions, modifications, or deletions to elements, attributes, attribute values, or time related message data to cause the configuration of a schema-based time marker to be modified in accordance with the common schema.

Message processors can remove elements and attributes from an electronic message and insert elements and attributes to an electronic message in accordance with the common schema. It may be determined that an element or attribute within message 230 is to be removed. For example, if it was no longer desirable to track the processing delays associated with message 230, intermediary message processor 211 could remove a Delay element (and thus also remove any attributes and Delay Time Related Message Data associated with the delay element) from message 230. Other the other hand, it may be determined that an element or attribute is to be inserted into message 230. For example, if it was desirable to know when a message can be ignored, intermediary message processor 211 could insert an IgnoreAfter element into message 230.

Message processors can also change attribute values in accordance with the common schema. For example, intermediary message processor 211 can modify a Sig attribute value within message 230 to indicate that intermediary message processor 211 singed a portion of time related message data in message 230. Message processors can also change time related message data in accordance with the common schema. For example, when intermediary message processor 211 receives message 230, intermediary message processor 211 may modify Received Time Related Message Data to indicate the time the message was received.

Some modifications can include modifying both an attribute value and a portion of time related message data. For example, if intermediary message processor 211 encrypts expiration time related data, intermediary message processor 211 may also modify an Enc attribute value of an Expires element to indicate to other message processors that the expiration time related data has been encrypted.

The method 300 also includes an act of routing the message (act 304). This can include routing an electronic message to another message processor included in the routing path. As shown by arrow 2 in FIG. 2, intermediary message processor 211 can route message 230 to intermediary message processor 212.

Figure 4:
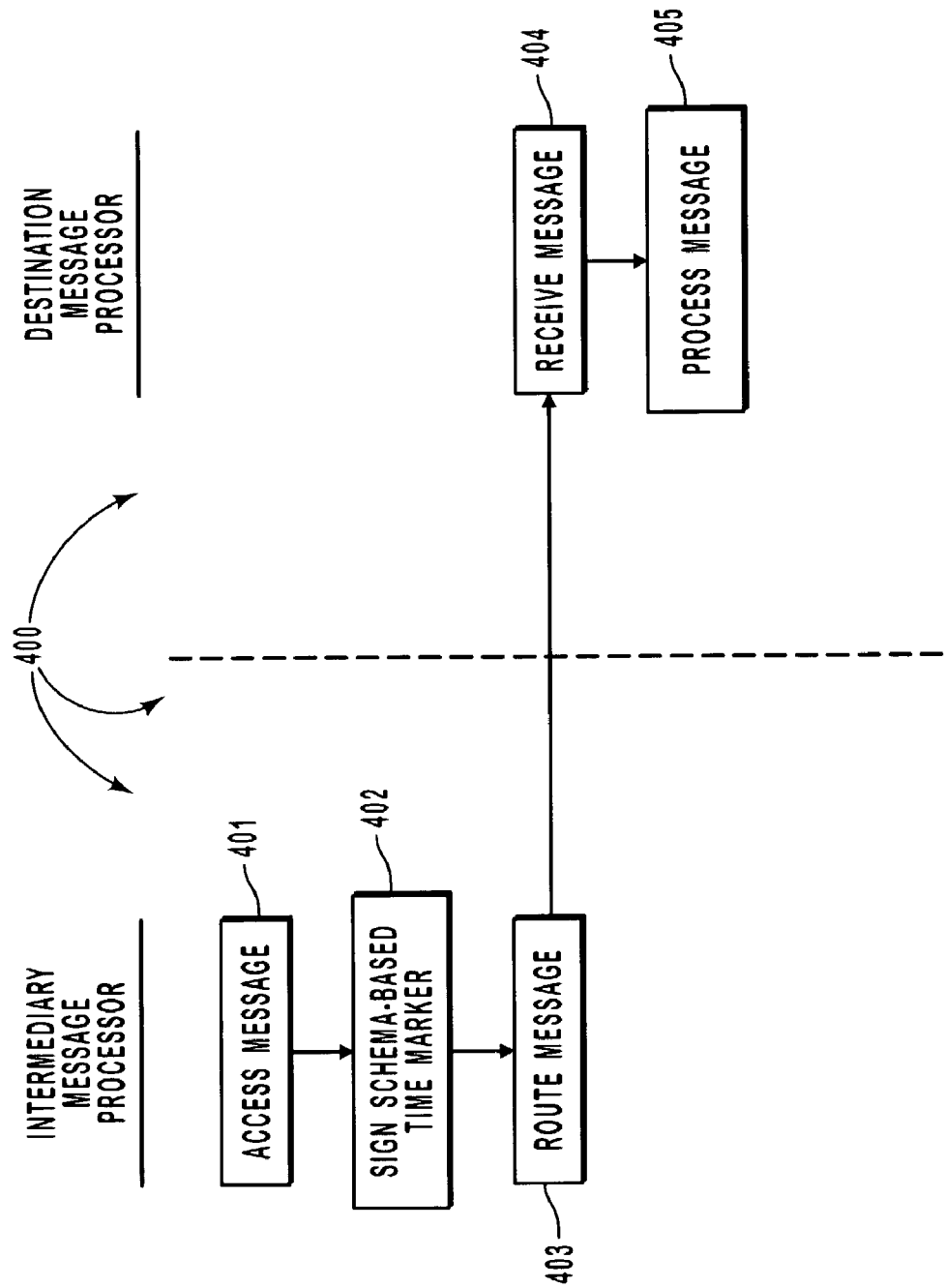
FIG. 4 illustrates a flowchart of a method for a message processor to indicate that a portion of time related message data is trusted time related message data.

FIG. 4 illustrates a flowchart of a method 400 for a first message processor to indicate to a second message processor that a portion of time related message data inserted into an electronic message by a third message processor is valid time related message data. The method 400 will be described with respect to the message processors depicted in network architecture 200.

The method 400 includes an act of accessing a message (act 401). This can include accessing an electronic message that is to be routed to the destination message processor. For example, intermediary message process 212 can receive message 230 that is to be routed to destination message processor 221. Message 230 can contain at least a first schema-based time marker that was inserted into message 230 by intermediary message process 211. Intermediary message processor 211 and intermediary message processor 212 may have a trust relationship such that intermediary message processor 212 assumes any time related message data inserted into electronic messages by intermediary message processor 211 is valid and/or vice versa.

The method 400 also includes an act of signing a schema-based time marker (act 402). This can include inserting a signature into an electronic message. For example, intermediary message processor 212 may modify a Sig attribute value in message 230 to indicate that intermediary message processor 212 has signed a portion of the time related message data included in message 230 (e.g. Expires Time Related Message Data). Destination message processor 221 and intermediary message processor 212 may have a trust relationship such that destination message processor 221 assumes any time related message data signed by intermediary message processor 212 is valid. This trust relationship can be configured to include time related message data inserted into electronic messages by message processors other than intermediary message processor 212. Thus, intermediary message processor 212 can be viewed as a time related message data notary for destination message processor 221.

If destination message processor 221 subsequently processes the modified Sig attribute value, this processing can indicate that the signed time related message data should be trusted. Thus, even if destination computer system 221 does not trust intermediary message processor 211, intermediary message processor 212 can indicate to destination computer system 221 that time related message data from intermediary message processor 211 can be trusted.

Further, in some implementations, a plurality of message processors can sign time related message data to "cross certify" the time related message data. For example, a message processor can add a signature to time related message data that is already associated with signatures from one or more other message processors. The addition of a signature from the message processor has little, if any, impact on the signatures from the one or more other message processors. Likewise, the message processor can add time related message data to an electronic message, which can be subsequently signed by the one or more other message processors.

The method 400 also includes an act of routing the message (act 403). This can include routing the message along the routing path to the destination message processor. As shown by arrow 5 in FIG. 2, intermediary message processor 212 can route message 230 to destination message processor 221 However, a message can be routed through one or more additional intermediaries before being received at destination message processor 221.

The method 400 includes an act of receiving the message (act 404). As shown by arrow 5 in FIG. 2, destination message processor 221 can receive message 230 from intermediary message processor 212.

The method 400 includes an act of processing the message (act 405). This can include processing a portion of an electronic message according to at least one schema-based time marker included in the electronic message. For example, after receiving message 230, destination message processor 221 can process the time related message data signed by intermediary message processor 212 as trusted time related message data. Thus, destination message processor 221 can be caused to process time related message data that it may otherwise not process because the time related message would be viewed as untrustworthy. That is, destination message processor 221 and intermediary message processor 211 may not have a trusted relationship. However, as a result of intermediary message processor 212 (a message processor trusted by destination message processor 221) signing the time related message data inserted by intermediary message processor 211, destination message processor 221 may trust this inserted time related message data.

In some implementations of the present invention it may be desirable to store particular time related message data for later use. In these implementations, a message processor can be designated as an escrow message processor for the particular time related message data. For example, it may be desirable to store portions of time related data included in message 230. As message 230 is routed along a routing path from originating message processor 201 to destination message processor 221, the message may be routed through intermediary message processor 212.

Intermediary message processor 212 may extract portions of time related data and send the portions to an escrow message processor. As shown by arrow 3 in FIG. 2, intermediary message processor 212 can send a message to intermediary message processor 213. This can be a message including the extracted portions of time related message data. Intermediary message processor 213 can store these portions of time related message data for later retrieval. As shown by arrow 4 in FIG. 2, intermediary message processor 213 can provide an indication to intermediary message processor 212 that the extracted portions of time related message data were successfully stored.

Alternately, intermediary message processor 212 may route message 230 to intermediary message processor 213. Intermediary message processor 213 may then extract and store portions of time related message data. Intermediary message processor 213 may provide an indication to inter-mediary message processor 212 of what portions of time related message data were extracted and stored. Intermediary message processor 213 can route message 230 back to intermediary message processor 212.

Likewise, when it is desirable to notarize particular time related message data (or any other data in a message), a message processor can be designated as a notary message processor for the particular time related message data (or other data). For example, it may be desirable to notarize portions of time related message data included in message 230. As message 230 is routed along a routing path from originating message processor 201 to destination message processor 221, the message may be routed through intermediary message processor 212.

Intermediary message processor 212 may extract portions of time related message data and send the portions to a notary message processor. As shown by arrow 3 in FIG. 2, intermediary message processor 212 can send a message to intermediary message processor 213. This can be a message including the extracted portions of time related message data. Intermediary message processor 213 can notarize these portions of time related message data (e.g., by adding a Notary timestamp). As shown by arrow 4 in FIG. 2, intermediary message processor 213 can provide notarized time related message data back to intermediary message processor 212.

Alternately, intermediary message processor 212 may route message 230 to intermediary message processor 213. Intermediary message processor 213 can notarize portions of time related message data (e.g., by adding a Notary timestamp) and route message 230 back to intermediary message processor 212.

It may also be that a notary message processor notarizes other data included in a message. For example, a notary message processor may notarize data from message 230 that is to be processed by an application at destination message processor 221 (e.g., data in body 511). This can include notarizing portions of data extracted from message 230 or data that is notarized as a result of message 230 being routed to a notary message processor.

Figure 6:
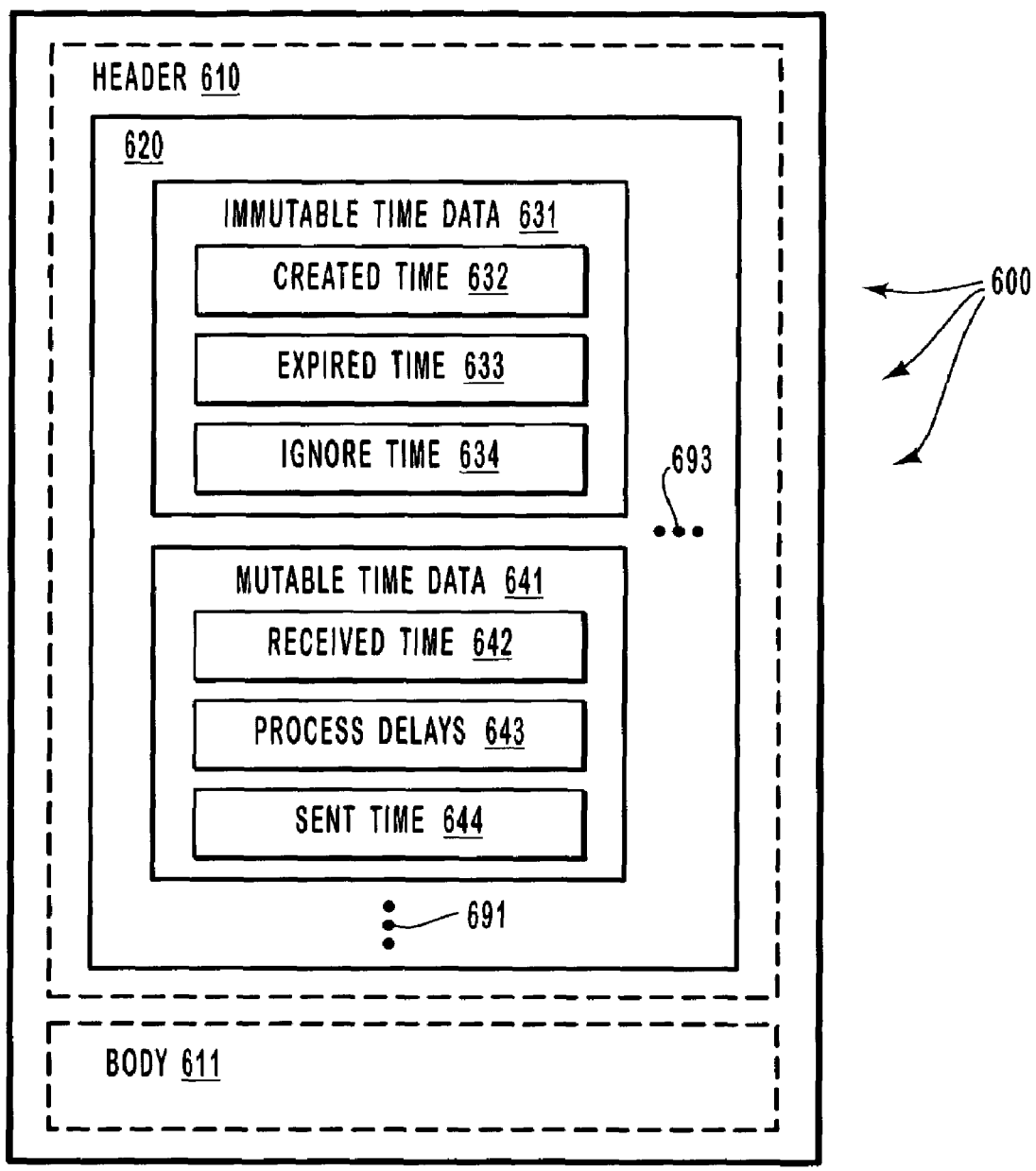
FIG. 6 illustrates a second example of a message containing a schema-based time marker.

Depicted in FIG. 6 is a message 600. Message 600 is an example of another format of message that can be used when implementing the principles of the present invention. Message 600 includes header 610 and body 611. In the example message 600, header 610 includes schema-based time marker 620, which further includes the header elements immutable time data 631 and mutable time data 641. Immutable time data 631 can further include elements representing time related message data that is unlikely to change during the lifetime of message 600, such as, for example, created time 632, expired time 642, and ignore time 634. Mutable time data 641 can further included elements representing time related message data this is likely to change during the lifetime of message 600, such as, for example, received time 642, process delays 643, and sent time 645. Ellipsis 693 and vertical ellipsis 691 illustrate that other immutable time data and/or mutable time data can be included in message 600.

The following is a structure in which a schema-based time marker is included within the body a second example SOAP envelope:

```
 1.  <Envelope>
 2.     <Header>
 3.        .
 4.        .
 5.        .
 6.        <Timestamps Target = ". . ." Sig = ". . .">
 7.           <Created Actor = ". . ." Enc = ". . .">
 8.              CREATION TIME RELATED MESSAGE DATA
 9.           </Created>
10.           <Expires Actor = ". . ." Enc = ". . .">
11.              EXPIRATION TIME RELATED MESSAGE DATA
12.           </Expires>
13.           <IgnoreAfter Actor = ". . ." Enc = ". . .">
14.              IGNORE TIME RELATED DATA
15.           </IgnoreAfter>
16.        </Timestamps>
17.        .
18.        .
19.        .
20.        <TimestampTrace Target = ". . .">
21.           <Sent Actor = ". . ." Sig = ". . ." Enc = ". . .">
22.              SENT TIME RELATED MESSAGE DATA
23.           </Sent>
24.           <Received Actor = ". . ." Sig = ". . ." Enc = ". . .">
```

-continued

```
25.            RECEIVED TIME RELATED MESSAGE DATA
26.         </Received>
27.         <Delay Actor = ". . ." Sig = ". . ." Enc = ". . ." Unit = ". . .">
28.            DELAY TIME RELATED MESSAGE DATA
29.         </Delay>
30.         <Timestamp Actor = ". . ." Sig = ". . ." Enc = ". . ." Type = ". . .">
31.            EXTENSIBLE TIME RELATED MESSAGE DATA
32.         </Timestamp>
33.      </TimestampTrace>
34.         .
35.         .
36.         .
37.      </Header>
38.      <Body>
39.         .
40.         .
41          .
42.      </Body>
43.   </Envelope>
```

The elements and attributes within the header portion of the second example SOAP envelope (i.e., between the <Header> and </Header> elements) can include one more XML documents defined in accordance with an XML schema that is accessible to the message processors depicted in network architecture 200. Where an ellipsis or vertical ellipsis appears, this indicates that other header information and/or body information can be included in the first example SOAP envelope.

The second example SOAP envelope includes a Timestamps element (i.e., between <Timestamps> and </Timestamps>) and a TimestampTrace element (i.e., between <TimestampTrace> and </TimestampTrace>). Included within the within the Timestamp element are other elements representing immutable time related message data, such as, for example, Create, Expire, and IgnoreAfter. Since it is unlikely that immutable time related message data will change, all immutable time related message data can be signed with the same signature as illustrated by the Sig attribute at line 6. Included within the TimestampTrace element are other elements representing mutable time related message data, such as, for example, sent receive, delay, and a generic timestamp. Since it is likely that mutable time related message data will change, elements within mutable time related message data can be signed individually. For example, each of the elements within the TimestampTrace element have individual Sig attributes (at lines 21, 24, 27, 30).

Since schema-based time markers maintain a structure and meaning of time related message data according to a schema, time related message data can be more easily identified and processed at a message processor. Further, because a schema can define virtually any type of data, the time-related message data that can be maintained is not limited or restricted to fixed types of data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system including a message processor capable of initiating an electronic message and routing the electronic message along a routing path towards a destination message processor, wherein the routing path may include one or more intermediary message processors, a method for the initiating message processor or any of the one or more intermediary message processors to process time related message data included in an electronic message, the method comprising:

an act of accessing an electronic message that includes a header and a body, the header including a plurality of schema-based time markers that correspond to a schema shared between message processors in the distributed system, wherein the schema-based time markers each include a time element and an attribute group corresponding to the respective time element, the attribute group including an actor attribute field, a signature attribute field, and an encryption attribute field for the respective time element;

an act of identifying from within the electronic message at least one of the schema-based time markers having a time element including time related message data associated with the accessing message processor;

an act of determining if a schema-based time marker within the electronic message should be modified by the accessing message processor;

an act of storing the electronic message on a computer-readable storage medium; and an act of transmitting the electronic message to another message processor included in the routing path.

2. The method as recited in claim 1, wherein the act of accessing the electronic message comprises accessing a SOAP Envelope.

3. The method as recited in claim 1, wherein the act of identifying from within the electronic message any schema-based time markers including time related message data comprises an act of identifying a schema-based time marker defined in accordance with an XML schema.

4. The method as recited in claim 1, wherein the act of identifying from within the electronic message at least one schema-based time marker including time related message data comprises identifying encrypted time related message data.

5. The method as recited in claim 1, wherein the act of identifying from within the electronic message at least one schema-based time marker including time related message data comprises identifying signed time related message data.

6. The method as recited in claim 1, wherein the act of identifying from within the electronic message at least one schema-based time marker including time related message data comprises identifying time related message data that references the accessing message processor by URI.

7. The method as recited in claim 1, wherein the act of identifying from within the electronic message at least one schema-based time marker including time related message data comprises identifying time related message data that indicates when the electronic message expires.

8. The method as recited in claim 1, wherein the act of identifying from within the electronic message at least one schema-based time marker including time related message data comprises identifying time related message data that indicates when the electronic message can be ignored.

9. The method as recited in claim 1, wherein the act of identifying from within the electronic message at least one schema-based time marker including time related message data comprises identifying time related message data that indicates when the electronic message was received.

10. The method as recited in claim 1, wherein the act of identifying from within the electronic message at least one schema-based time marker including time related message data comprises identifying time related message data that indicates when the electronic message was sent.

11. The method as recited in claim 1, wherein the act of identifying from within the electronic message at least one schema-based time marker including time related message data comprises identifying time related message data that indicates when the electronic message was created.

12. The method as recited in claim 1, wherein the act of identifying from within the electronic message at least one schema-based time marker including time related message data comprises identifying time related message data that indicates a processing delay associated with the electronic message.

13. The method as recited in claim 1, wherein the act of identifying from within the electronic message at least one schema-based time marker including time related message data comprises identifying time related message data that indicates that the electronic message was notarized.

14. The method as recited in claim 1, wherein the act of identifying from within the electronic message at least one schema-based time marker including time related message data comprises identifying time related message data that indicates signatures within the electronic message should be validated.

15. The method as recited in claim 1, wherein the act of identifying from within the electronic message at least one schema-based time marker including time related message data comprises identifying time related message data included in XML instructions in a header portion of a SOAP message.

16. The message as recited in claim 1, wherein the act of determining if the configuration of a schema-based time marker within the electronic message should be modified comprises an act of determining that the configuration of the schema-based time marker is to be modified.

17. The method as recited in claim 16, wherein determining that the configuration of the schema-based time marker is to be modified comprises changing time related message data included in the time element of the schema-based time marker in accordance with the schema used to define the schema-based time maker.

18. The method as recited in claim 16, wherein determining that the configuration of the schema-based time marker within the message is to be modified comprises changing time related message data within a SOAP envelope.

19. The method as recited in claim 16, wherein determining that the configuration of the schema-based time marker is to be modified comprises encrypting time related message data in the header of the electronic message.

20. The method as recited in claim 16, wherein determining that the configuration of the schema-based time marker is to be modified comprises decrypting time related message data in the header of the electronic message.

21. The method as recited in claim 16, wherein determining that the configuration of the schema-based time marker is to be modified comprises signing time related message data in the header of a electronic message.

22. The method as recited in claim 21, wherein signing time related message data in the header of the electronic message comprises adding a signature to time related message data that already includes signatures for one or more other message processors.

23. The method as recited in claim 16, wherein determining that the configuration of the schema-based time marker is to be modified comprises placing a portion of time related message data in escrow.

24. The method as recited in claim 16, wherein determining that the configuration of the schema-based time marker is to be modified comprises indicating that a portion of time related message data is to be processed by a particular message processor in the routing path by including a URI that references the particular message processor in a header portion of the electronic message.

25. The method as recited in claim 16, wherein determining that the configuration of the schema-based time marker is to be modified comprises notarizing a portion of time related message data.

26. A method as recited in claim 1, further comprising:
an act of inserting a signature into the electronic message, wherein the signature, indicates, to a destination message processor processing the signature, that at least a portion of the time related message data within the first schema-based time marker should be trusted.

27. A method as recited in claim 1, wherein each of the actor attribute field, signature attribute field, and encryption attribute field include name value pairs.

28. A method as recited in claim 1, wherein each of the plurality of schema-based time markers includes a units attribute field and a type attribute field.

29. A method as recited in claim 1, wherein the encryption attribute field of the schema-based time marker includes at least the encryption includes an encryption algorithm used to encrypt the electronic message.

30. A method as recited in claim 1, wherein the actor attribute field identifies a message processor to process the time related message of the corresponding time element.

31. In a destination message processor capable of receiving an electronic message that was routed to the destination message processor along a routing path including one or more other intermediary message processors, a method for the destination message processor to process the electronic message in accordance with a schema, the method comprising:
an act of receiving an electronic message that includes a header and a body, the header having multiple schema-based time markers, each of the schema-based time markers including time related message data targeted to a destination message processor, wherein each of the multiple schema-based time marker corresponds to a schema shared between the destination message processor and the said one or more intermediary message processors in a distributed system, and wherein multiple schema-based time markers each include a time element storing the time related message data and an attribute group corresponding to the respective time element, each attribute group including an actor attribute field, a signature attribute field, and an encryption attribute field for the respective time element; an act of storing the electronic message; and an act of processing the electronic message according to the schema used to define the at least one schema-based time marker included in the electronic message.

32. The method as recited in claim 31, wherein the act of processing the electronic message according to the schema used to define the at least one schema-based time marker included in the electronic message comprises processing time related message data inserted into the electronic message by a first message processor as trusted time related message data because the time related message data was signed by a second message processor that is trusted by the destination message processor.

33. A computer program product for use in a distributed system including a message processor capable of initiating an electronic message and routing the electronic message along a routing path towards a destination message processor, the routing path including one or more intermediary message processors, the computer program product comprising one or more computer-readable storage media having stored thereon computer-executable instructions that, when executed by a processor, implement a method for processing time related message data in the electronic message, the computer executable instructions including:

computer-executable instructions for accessing an electronic message that includes a header and a body, the header including a plurality of schema-based time markers that correspond to a schema shared between message processors in a distributed system, wherein the schema-based time markers each include a time element and an attribute group corresponding to the respective time element, the attribute group including actor attribute field, a signature attribute field, and an encryption attribute field for the respective time element;

computer-executable instructions for identifying from within the electronic message any schema-based time markers including a time element having time related message data associated with the accessing message processor;

computer-executable instructions for determining if a schema-based time marker within the message should be modified by the accessing message processor; and computer-executable instructions for storing the electronic message on a computer-readable storage medium.

34. The computer program product as recited in claim 33, wherein computer-executable instructions for accessing the electronic message further comprise computer-executable instructions for accessing a SOAP envelope.

35. The computer program product as recited in claim 33, wherein computer-executable instructions for identifying from within the electronic message any schema-based time markers including time related message data further comprise computer-executable instructions for identifying time related message data structured in accordance with an XML schema.

36. The computer program product as recited in claim 33, wherein computer-executable instructions for determining if the configuration of schema-based time markers within the message should be modified further comprise computer-executable instructions for determining if XML instructions should be changed according to the XML schema that defines the schema-based time marker.

37. The computer program product as recited in claim 33, further comprising:

computer-executable instructions for routing the electronic message to another message processor included in the routing path.

38. The computer program product as recited in claim 33, further compromising:

computer-executable instructions for terminating the message.

* * * * *